United States Patent [19]

Doroszkowski et al.

[11] Patent Number: 4,690,837

[45] Date of Patent: Sep. 1, 1987

[54] PROCESS OF COATING A HEATED SURFACE

[75] Inventors: Andrew Doroszkowski, Marlow; Maurice W. Skinner, Maidenhead, both of England

[73] Assignee: Imperial Chemical Industries PLC, London, England

[21] Appl. No.: 943,879

[22] Filed: Dec. 18, 1986

Related U.S. Application Data

[63] Continuation of Ser. No. 689,968, Jan. 9, 1985, abandoned.

[30] Foreign Application Priority Data

Jan. 27, 1984 [GB] United Kingdom ................. 8402191

[51] Int. Cl.[4] ............................................. B05D 3/02

[52] U.S. Cl. ................................... 427/314; 427/316; 427/318; 427/385.5; 427/388.4; 427/393.5

[58] Field of Search ............ 427/314, 316, 318, 385.5, 427/388.3, 388.4, 393.5; 428/423.5, 424.6, 475.8, 476.3, 500, 457

[56] References Cited

U.S. PATENT DOCUMENTS

| | | | |
|---|---|---|---|
| 3,446,652 | 5/1969 | Smith | 427/388.4 |
| 3,949,107 | 4/1976 | Schoenholz et al. | 427/316 |
| 4,421,569 | 12/1983 | Dichter et al. | 427/318 |
| 4,517,245 | 5/1985 | Spain | 427/385.5 |
| 4,522,851 | 6/1985 | Rosthauser | 427/388.4 |

FOREIGN PATENT DOCUMENTS

| | | | |
|---|---|---|---|
| 2258423 | 8/1975 | France | 427/385.5 |
| 1203257 | 8/1970 | United Kingdom | 427/385.5 |
| 1401897 | 8/1975 | United Kingdom | 427/385.5 |
| 1501089 | 2/1978 | United Kingdom | 427/385.5 |
| 1558951 | 1/1980 | United Kingdom | 427/385.5 |
| 2029849 | 3/1980 | United Kingdom | 427/385.5 |

*Primary Examiner*—Sadie L. Childs

*Attorney, Agent, or Firm*—Cushman, Darby & Cushman

[57] ABSTRACT

A process of coating a surface of an article which is capable of being heated, by contacting the heated surface of the article with a coating composition comprising an aqueous dispersion of an organic film-forming material which is sterically stabilized and which has a critical coalescence temperature which is lower than the temperature to which the surface of the article is heated. Suitable coating compositions are described.

9 Claims, No Drawings

PROCESS OF COATING A HEATED SURFACE

This is a continuation of application Ser. No. 689,968, filed Jan. 9, 1985, which was abandoned upon the filing hereof.

This invention relates to a process for coating a surface of an article which is capable of being heated, and to coating compositions which are useful in the process.

It is common practice to coat the surface of an article by first immersing it in a coating composition which comprises a film-forming material dispersed in a relatively volatile continuous medium; and then withdrawing the article and allowing the continuous medium to volatilise, usually at an elevated temperature. The residual material on the article may be subjected to any necessary further treatment, for example a high temperature treatment, in order to produce a desired final coating. The thickness and evenness of the final coating are determined to a large extent by the rheology and solids content of the coating composition and by the shape of the article; and it is a disadvantage of this type of process that, for a number of reasons, coatings of uneven thickness are frequently obtained.

It is also common practice to electrodeposit a coating onto the surface of a conductive article by passing an electric current between the article (as one electrode) and a counter-electrode, the article being immersed in an aqueous coating composition and being in electrical communication with the counterelectrode. The electrodeposited coating, which is usually of even thickness on surfaces of similar electrical accessibility to the counter-electrode due to the self-insulating nature of the coating, adheres sufficiently well to a surface to allow the removal of excess coating composition by a water rinse. Since the thickness and evenness of the coating is not greatly dependent on the rheology and solids content of the coating composition, the composition is generally of much lower solids content than that used in the process first mentioned above, so that there is a relatively small amount of composition lost in the rinsing step and even this amount can be recovered from the rinse water. However the electrodeposition process requires complex electrical equipment and accurate control of the content of the coating composition.

Immersion coating processes are also known which comprise as one step the application or removal of heat energy whilst an article is in contact with a coating composition. In one such process, which is a modification of the above first-mentioned process, the rate of volatilisation of the continuous medium from an article when removed from a coating composition is increased by raising the temperature of the coating composition above the ambient temperature. The object in this process is to minimise the appearance of drainage sags but the uniformity of the coating still depends upon the ability of the composition to drain off the article and this is a problem with articles of complex shape. In another process a heated article is immersed in a plastisol, i.e. a polymeric material which has been swollen with a non-aqueous plasticiser, the temperature of the article being higher than the fusion temperature of the plastisol so that plastisol adjacent the surface of the article is caused to melt and to adhere to the surface.

We have now found that certain aqueous dispersions of film-forming materials which are sterically stabilised in the presence of certain hydrophilic moieties are unstable at elevated temperatures and we have found that these dispersions can be employed in a new coating process.

According to the present invention we provide a process of coating a surface of an article which is capable of being heated, by contacting the heated surface of the article with a coating composition comprising an aqueous dispersion of an organic film-forming material which is sterically stabilised (as herein defined) and which has a critical coalescence temperature (as herein defined) which is lower than the temperature to which the surface of the article is heated, so that the film-forming material is de-stabilised.

The critical coalescence temperature of a film-forming material to be used in the process, together, i.e. when combined, with any other component of the coating composition which will affect the coalescing behaviour of the film-forming material, is determined as follows:

An aqueous dispersion of the film-forming material at the solids content which is to be used in a coating composition (and together with any other component which will affect the coalescing temperature of the material), is placed in a glass beaker. A magnetic bead is placed inside the beaker in order to achieve gentle stirring when using a magnetic hotplate device. This beaker is surrounded by a larger beaker containing a water/glycerol solution to ensure even heating by the magnetic hotplate placed beneath it. Heat is applied to the water/glycerol solution so that a thermometer placed in the dispersion indicates a rise in temperature from ambient of about 1° C. per minute. The temperature at which coalescence of the dispersion is clearly detectable is recorded as the critical coalescence temperature (°C.).

By an aqueous dispersion of organic film-forming material we mean that the organic film-forming material is present in an aqueous medium as disperse particles, for example as an emulsified liquid particle, or as a solid particle.

By the term steric stabilisation in this specification we mean that the organic film-forming material is stabilised in an aqueous medium by nonionic hydrophilic polymer moieties which contribute enthalpic steric stabilisation (see page 47 of K. E. J. Barrett, "Dispersion Polymerisation in Organic Media", John Wiley, London 1975 & Napper, D. H. & Hunter, R. J. in "Surface Chemistry & Colloids", Vol.7 (Ed. Verker,M) Butterworths, London 1972). A small proportion of charge may be associated with the organic film-forming polymer provided that it is not a stabilising charge, whether anionic or cationic, and provided that stabilisation is due primarily to the defined non-ionic hydrophilic moieties. Preferably the organic film-forming material is substantially free from, or is not associated with, ionisable groups.

Preferably the organic film-forming material is stabilised by non-ionic hydrophilic moieties derived from poly(ethylene glycol), poly(vinyl pyrollidone) or poly(vinyl alcohol) which has been obtained by hydrolysis of poly(vinyl acetate). These moieties may be contained in the structure of the organic film-forming polymer or may be comprised in a distinct surface active component of the aqueous dispersion which is associated with the organic film-forming polymer.

Suitable organic film-forming materials for use in this invention include synthetic polymers such as alkyd resins; oil-modified alkyd resins; saturated and unsaturated polyesters; polyurethanes, such as are derived from a material containing an active hydrogen atom & from any of the wide variety of organic polyisocyanates including aromatic, aliphatic and cycloaliphatic diisocyanates or capped or blocked isocyanates derived therefrom; epoxy resins; addition polymers, for example polymers or copolymers of styrene such as styrene/-butadiene, polymers and copolymers of the esters of acrylic and methacrylic acid, and halogenated vinyl and vinylidene polymers and copolymers; petroleum resins such as polyisobutylene; nitrogen resins such as melamine/formaldehyde and urea/formaldehyde; phenolic resins; rubbers; & silicone resins. When a non-ionic hydrophilic moiety is desired to be present in the structure of the film-forming material, for example a moiety derived from poly(ethylene glycol), it may be introduced by conventional methods such as by esterification, by etherification or by block or graft copolymerisation. In one example, moieties of poly(ethylene glycol) may be introduced into a carboxyl group-containing alkyd resin by esterification of the carboxyl groups with a poly(ethylene glycol). In another example the epoxide groups of an epoxy resin may be etherified with a methoxypolyethylene glycol or alternatively by hydrolysis and reaction with ethylene oxide. Usually it will be necessary for the film-forming material to contain at least 1% by weight of the non-ionic hydrophilic moieties to effect a stable dispersion and generally it is preferred that the material contains not more than 50% by weight of these moieties When the non-ionic hydrophilic moieties are contained in a distinct surfactant associated with the organic film-forming polymer there is preferably used at least 0.1% by weight of the surfactant based on the weight of film-forming material. Suitable surfactants include poly(ethylene glycol) & poly(vinyl alcohol).

The article having the surface to be coated may be any article in which the surface is capable of being heated whether the surface is heated before, during, or after the step in which it is brought into contact with the coating composition. The surface to be heated may be of a material which is different from the remainder of the article. Suitable surfaces to be coated include metal surfaces such as iron, steel, phosphated steel, galvanised steel, aluminium or copper; painted surfaces; and surfaces of plastics materials such as nylon & polyvinyl chloride.

The heating of the surface to be coated may be carried out in a wide variety of ways and the remainder of the article may or may not be heated at the same time. The whole article, for example, may be heated to a temperature higher than the critical coalescence temperature before immersion in the coating composition or the whole article or one part of the article may be heated in situ whilst immersed in the composition.

One method of heating in situ is that of induction heating and any electrically conductive component of an article may be heated in this way. The electrically conductive component may be that component of an article having the surface which is to be coated and this surface may have been previously coated, for example with a primer paint. Alternatively the electrically conductive component may only be the means for heating another component of an article having the surface which is to be coated. When the heating is to be carried out by induction heating there is a particular advantage in that the coating process is subject to good control, for example the thickness of the coating produced can be controlled by varying the frequency of radiation and the intensity of radiation in suitable combination with the solids content and temperature of the coating composition.

In carrying out the process of this invention it is preferred that the coating composition used has a critical coalescence temperature in the range 25°-99° C. This ensures that the composition is stable at ambient temperatures and yet is destabilised at temperatures which do not require excessive heating of the article having the surface to be coated. In general it is preferred to heat the surface to be coated to a temperature at least 5° C. above the critical coalescence temperature in order that satisfactory deposition is achieved, more preferably at least 20° C. above.

This invention also provides a coating composition, suitable for use in the above process, comprising an aqueous dispersion of an organic film-forming material which is sterically stabilised (as herein defined) and which has a critical coalescence temperature (as herein defined) which is lower than the temperature to which the surface of the article is heated. The invention further provides an article which has been coated by the above process. The resin solids content of the composition is preferably in the range 1-48% by weight based on the total weight of the composition. The composition may contain any of the conventional coating ingredients, for example pigment, filler, crosslinking agent, plasticiser, organic solvent and flow control agents.

Articles to be coated may be immersed singly in the coating composition and then removed, or a series of articles may be passed sequentially through the composition at the same time. Preferably the composition is well agitated and replenishment composition is added to maintain a desired solids content. It may be necessary to provide a means for cooling the composition in order to maintain a satisfactory temperature differential between the composition and the article to be coated.

After removal from the coating composition the deposited coating is freed from excess coating composition by rinsing with water and may then be heated to produce the final coating, for example by a crosslinking reaction.

It should be noted that when an article is heated only before it is brought into contact with the coating composition the heat conductivity of the article must be taken into account when determining the temperature to which it is heated, in order that there is a sufficient differential between the critical coalescence temperature of the film-forming material and the effective temperature at the surface of the article which is to be coated. For example in the case of an article of plastics material which has a low heat conductivity, for a given coating composition comprising organic film-forming material of given critical coalescence temperature and for a given coating bath temperature, it is necessary to heat the article to a higher temperature than in the case of an article of metal which has a high heat conductivity.

Distinct surfactants containing non-ionic hydrophilic moieties, which may be associated with an organic film-forming polymer present as an aqueous dispersion in the coating compositions of this invention, include those commercially available as "Tween" 80, "Brij" 98 and "Mowiol" 4-88.

The invention is illustrated by the following Examples in which parts and percentages are by weight.

EXAMPLE 1

This Example illustrates the preparation of a coating composition useful in the process of this invention.

(a) Preparation of film-forming Polymer A

Polymer A was prepared by charging a flask with 510 parts of an epoxy resin of epoxide value 0.104–0.115 equivalents epoxide per 100 g resin. (commercially available as "Epikote" 1001; Epikote is a Registered Trade Mark of Shell Chemicals), 128.7 parts of poly-(caprolactone diol) (commercially available as "PCP-0200" from Union Carbide); 345 parts of methyl isobutyl ketone and 3.8 parts of dimethyl benzylamine and 213 parts of the mono methyl ether of poly(ethylene glycol) of approximate molecular weight 2000. The mixture was heated to 125° C. and maintained at this temperature for 16 hours with constant stirring. When the epoxide value of the mixture was reduced to 35 mg KOH/g resin non-vol., 76.8 parts of p-nitro benzoic acid were added and the temperature was maintained at 125° C. for another 5 hours by which time the acid value was reduced to zero.

(b) Preparation of coating composition from Polymer A and crosslinking agent 903 parts of Polymer A, as prepared in (a) above, were blended, using gentle heat with 284 parts of a polyurethane crosslinking agent prepared from caprolactam/trimethylol propane/tolylene diisocyanate in the molar ratio 1/0.34/1 in a 76/24 mixture of methyl isobutyl ketone/monoethyl ether of ethylene glycol. (This crosslinking agent has been described by D. H. Solomon at page 226 of "The Chemistry of Organic Film-Formers" 2nd edition, R. E. Krieger Publishing Company). The blend was emulsified in 1254 parts deionised water and 60 parts of 2-butoxy ethanol at approximately 60° C. using a high speed stirrer to produce a stable, fine particle size emulsion of 34% solids content. The emulsion, which was a coating composition according to the invention, had a viscosity of 29 centipoise at 25° C. and its critical coalescence temperature was found to be 70° C.

EXAMPLE 2

This Example illustrates the coating of an untreated (bare) steel panel and a phosphated steel panel.

A coating tank measuring 12 cm×5 cm and 16 cm high, made of plastics material was three-quarters filled with the coating composition described in Example 1(*b*).

(a) A 6"×4" untreated (bare) steel panel was heated to 120° C. in an oven and immediately dipped into the emulsion in the tank which was maintained at 30° C. The panel was left immersed for 1 minute, then withdrawn and rinsed with a jet of cold water at a pressure of 10 pounds/square inch (psi) to remove freely adhering emulsion. When no further material could be removed by the jet of water, the residual film was blown dry for a few seconds with a jet of air to remove all visible traces of water. The panel was stoved in an oven at 150° C. for 30 minutes to produce a tough, clear coating of uniform thickness of 26 microns.

(b) The procedure described in (a) was repeated using a 6"×4" phosphated steel panel heated to 120° C. before immersion. On withdrawal of the panel from the tank, it was rinsed with a jet of water at 10 psi, blown dry and stoved for 30 minutes at 150° C. to produce a tough, clear coating of uniform film thickness of 28 microns.

EXAMPLE 3

This Example illustrates the importance of heating the surface of the panel to a temperature above the critical coalescence temperature of the coating composition.

A 6"×4" phosphated steel panel was heated to 60° C. in an oven and immersed in an emulsion prepared as in Example 1(*b*) and maintained at 30° C. as described in Example 2. The panel remained immersed for 2 minutes, was then withdrawn and rinsed with water at 5 psi.

It was found that all of the material adhering to the panel was removed by the rinse water, and that no coating remained on the panel.

EXAMPLE 4

This Example illustrates the coating of a prepainted surface.

A coating composition consisting of an emulsion of similar composition to that described in Example 1(*b*), but having a 40% solids content, was placed into a container and its temperature was adjusted to 40° C.

A 6"×4" steel panel, having a primer coating of approximately 20 microns thickness (which had been electrodeposited and then stoved), was heated to 150° C. in an oven. On removal from the oven, the panel was immediately immersed in the coating composition. After immersion for 1 minute, the panel was removed and rinsed with a jet of cold water at 10 psi until no further material could be removed from its surface. The panel with the deposited film was then dried with an air jet and stoved in an oven for 30 minutes at 150° C. A clear, tough film of 47 microns thickness was obtained on top of the primed surface of the panel.

EXAMPLE 5

This Example illustrates the preparation of a coating composition, which comprises an emulsion of film-forming material stabilised by a distinct non-ionic surfactant and its use in the process of this invention.

(a) The following ingredients were premixed:

508 parts of a solution of butylated melamine-formaldehyde resin (commercially available as "Maprenal" MF 650: Maprenal is a Registered Trade Mark).

1198 parts of an alkyd resin prepared by coreacting coconut oil/trimethylol propane/glycerol/phthalic anhydride in the molar ratio 1/3.81/0.43/5.15 as a 70% solution in a blend of xylene/isobutyl alcohol.

10 parts of a 10% solution in butanol of a flow aid (commercially available as "Modaflow") and 4 parts of trimethylamine to give a final solution of 60% non-volatile content.

(b) 471 parts of resin solution (a) were mixed with 10 parts of a non-ionic surfactant (commercially available as "Brij 98": "Brij" is a Registered Trade Mark of Atlas Chemical Industries) and emulsified in 200 parts of deionised water with the aid of a high speed stirrer to produce a stable, fine particle size aqueous emulsion of 41.5% solids content. The emulsion had a viscosity of 40 centipoise and critical coalescence temperature of 75° C. (c) The emulsion (b) was placed in a small tank and the temperature brought to 35° C. A 6"×4" phosphated steel panel heated to 120° C. in an oven was immersed in the emulsion for 60 seconds and then withdrawn. The panel was rinsed with a jet of water at 10 psi pressure to remove non-adhering material. The panel was then stoved in an oven at 150° C. for 30 minutes to produce a smooth, tough, uniform film of 38 microns thickness.

EXAMPLE 6

This Example illustrates the preparation of a pigmented coating composition and its use in the process of this invention.

(a) 14.5 parts of a black pigment in the form of beads commercially available as "Philblack" APF ("Philblack" is a Registered Trade Mark) were dispersed in 487 parts of the resin solution as described in Example 5(*a*) using a bead mill.

12.5 parts of a non-ionic surfactant commercially available as "Tween" 80 ("Tween" is a Registered Trade Mark of Atlas Chemicals, USA), were then added and the product emulsified in 480 parts of deionised water to produce a pigmented dispersion of film-forming material at approximately 32% solids in water. The viscosity of the dispersion was 35 centipoise and the critical coalescence temperature 65° C.

(b) A 6"×4" phosphated steel panel was heated to 120° C. in an oven and was immersed in the dispersion described in (a) which was maintained at 35° C. After about 60 seconds immersion the panel was removed, rinsed with water as previously described and stoved in an oven at 150° C. for 30 minutes to produce a tough, glossy, black uniform film of 28 microns thickness.

EXAMPLE 7

This Example illustrates the preparation of a coating composition comprising a dispersion of a plasticised poly(methyl methacrylate) stabilised in the presence of a distinct non-ionic surfactant.

A thermoplastic, film-forming dispersion of acrylic polymer was prepared by first premixing 350 parts of poly(methyl methacrylate) solution at 40% solids in toluene with 146 parts dimethyl phthalate, 12 parts of "Tween" 80 and 122 parts of methyl isobutyl ketone. The mixture was then added to 415 parts of de-ionised water and emulsified by means of a high speed stirrer (a "Ystral" X10/20 Laboratory Disperser—"Ystral" is a Registered Trade Mark of Maschinenbau Processtechnik, D-7801 Ballrechten-Dottingen, Germany) to give a stable, fine particle size emulsion of 28% non-volatile content. The viscosity of the dispersion was 25 centipoise and the critical coalescence temperature was 62° C.

A 6"×4" phosphated steel panel was heated to 120° C. in an oven and then immersed into the above emulsion which was maintained at 25° C. After one minute immersion, the panel was withdrawn and rinsed with a jet of water at 10 psi until no further material could be removed from the surface of the panel. The panel was then blown dry with air and stoved in an oven at 130° C. for 30 minutes to produce a clear, tough film of 10 microns thickness.

EXAMPLE 8

This Example illustrates the process of the present invention in which the substrate to be coated is heated whilst immersed in the coating composition.

A 6"×4" phosphated steel panel was held immersed by means of plastic tongs in a coating composition contained in a glass tank, the composition having been prepared as described in Example 1(*b*). Both the panel and the coating composition were at the ambient temperature. A flat, spiral coil, made from ¼" (outside diameter) copper tubing, and the coil being approximately 8" in diameter, was connected to an induction heating apparatus so that cooled water was continuously circulated through the core of the copper coil. (The apparatus used was a "Cheltenham" Aperiodic Induction Heater operating at 20 kilohertz frequency, produced by Cheltenham Induction Limited, Cheltenham, England, U.K.)

The copper coil (i.e. the induction coil) was suspended about 7" above the steel panel and parallel to it. The electric power to the induction generator was switched on for 20 seconds. The steel panel reached a temperature which was higher than the critical coalescence temperature of the coating composition. On withdrawal of the steel panel and rinsing with water, it was found that an adherent polymer film had been deposited on the immersed steel panel, which on stoving at 150° C. for 30 minutes produced a tough, clear film.

EXAMPLE 9

This Example illustrates the coating of a plastic panel.

The emulsion described in Example 1(*b*), but diluted to 30% solids content with deionised water, was heated to 35° C. A mineral-filled panel of nylon 66 was heated in an oven to a temperature of 180° C. and was immersed in the emulsion for 2 minutes. The panel was removed, allowed to cool and rinsed with water. The panel was then blown dry and stoved at 150° C. for ½-hour to give a film of a uniform 25 micron thickness. Similar results were obtained with other plastics materials.

EXAMPLE 10

This Example illustrates the uniformity of coatings obtained by the process of this invention as compared with coatings obtained by a conventional dip-process.

Two bare steel panels measuring 15 cm×10 cm were each bent in similar manner into an L-form, the horizontal part of the 'L' being 5 cm long and the vertical part of the 'L' being 10 cm long. The first panel (A) was immersed for ½-minute to a depth of 8 cm (up the vertical part of the 'L') in a commercially available water-based dip primer (of solids content approximately 34% by weight). The excess paint was allowed to drain off the panel under gravity and the panel was then stoved at 165° C. for ½-hour. The second panel (B) was heated to 120° C. and then immersed for ½-minute to a depth of 8 cm (similarly up the vertical part of the 'L') in an emulsion (of 34% solids content) prepared according to Example 1(*b*). The panel was rinsed with water, air dried, and then stoved at 150° C. for ½-hour.

There was a "thick" edge to panel (A) of total thickness greater than 100 microns. There was no "thick" edge to panel (B). The coating thickness on other parts of each panel was measured using a "Minitector" gauge (supplied by Elcometer, Manchester, England). The coating thickness on panel (B) at a wide range of locations always lay within the range 12.5 to 15 microns. whereas on panel (A) at similar locations the coating thicknesses were within the range 4.5 to 50 microns. The coating thickness on panel (A) was particularly pronounced on the upper horizontal surface.

EXAMPLE 11

This Example illustrates the preparation and use of a coating composition stabilised by poly(vinyl alcohol).

162 parts of a fatty acid ester of "Epikote" 1004 (a commercially available epoxy resin) were mixed with 77 parts of a butylated melamine-formaldehyde resin (commercially available as "Maprenal" MF 650) were emulsified in a solution of 5.2 parts of (a 30% aqueous solution of) poly(vinyl alcohol) in 195 parts of deionised water and 10 parts of butyl cellosolve using an Ystral homogeniser. [The aqueous concentrate of poly(vinyl alcohol) is commercially available as "Mowiol" 4-88 and is based on an 88% hydrolysed poly(vinyl acetate)]. The stable emulsion had a critical coalescence temperature of 80° C.

A phosphated steel panel was heated to 120° C. and immersed for 1 minute in the above emulsion which was maintained at 35° C. The panel was removed, rinsed with water, air dried and stoved at 150° C. for ½-hour to produce a coating of uniform 17 microns thickness.

EXAMPLE 12

This Example illustrates the preparation and use of a coating composition comprising a mixture of resins.

68 parts of polymer A, as prepared in Example 1(*a*) were mixed with 228 parts of a fatty acid ester of "Epikote" 1004 and 141 parts of a phenol/formaldehyde resin. The mixture was emulsified in a blend of 344 parts of water and 18 parts of butyl "Cellosolve" using an Ystral homogeniser, the stable emulsion having a critical coalescence temperature of 53° C.

A phosphated steel panel was heated to 120° C. and immersed for 1 minute in the emulsion maintained at 250° C. The panel was rinsed with water, air-dried and stoved at 180° C. for ½-hour to produce a coating of uniform 30 microns thickness

EXAMPLE 13

This Example shows that a charge-stabilised emulsion cannot be used in the process of this invention.

The epoxide groups of "Epikote" 1007 (a commercially available epoxy resin) were reacted with methylpropanolamine and ethylene diamine as a 46% solution in butyl "Cellosolve" to yield a product having an amine content equivalent to 0.36 mg equivalents per g. of non-volatile resin. 260 parts of this resin, 89 parts of the blocked isocyanate used in Example 1(*b*) and 6.6 parts of acetic acid were emulsified in 450 parts of deionised water to give a 25% solids emulsion, the disperse particles being stabilised by cationic groups.

There was no evidence of an adherent coating when a phosphated steel panel was preheated to 150° C., immersed in the emulsion when maintained at 25° C. and then rinsed with water.

EXAMPLE 14

This Example illustrates the preparation and use of a coating composition comprising as surfactant an epoxy resin/ethylene oxide adduct.

"Epikote" 1004 (a commercially available epoxy resin) was treated as outlined in J.A.C.S. 70, 1235 (1948) to hydrolyse the epoxide groups and the resulting hydroxyl groups were ethoxylated with ethylene oxide to yield a product containing 60% by weight of ethylene oxide.

15 parts of the product just described were mixed as a surfactant with 180 parts of a tall oil fatty acid ester of "Epikote" 1004 and 86 parts of a butylated melamine/formaldehyde resin. The mixture was emulsified in 235 parts of water, the critical coalescence temperature of the emulsion being 50° C.

A phosphated steel panel preheated to 120° C. was immersed for 1 minute in the emulsion, which was maintained at 250° C., removed and rinsed with water, air dried and stoved at 150° C. for ½-hour. A film of 50 microns thickness was obtained.

EXAMPLE 15

This Example illustrates the use as surfactant of a copolymer comprising vinyl pyrollidone as a comonomer.

A random copolymer of methyl methacrylate/vinyl pyrollidone (50/50) was prepared in butyl "Cellosolve" using azodiisobutyronitrile as initiator. 16 parts of this copolymer as surfactant, 293 parts of the tall oil fatty acid ester of "Epikote" 1004 and 125 parts of a butylated melamine/formaldehyde were emulsified in 366 parts of deionised water to give an emulsion of 31.5% solids content using an Ystral homogeniser.

A phosphated steel panel preheated to 120° C. was immersed in the emulsion maintained at 25° C. The panel was allowed to cool in the emulsion, removed and rinsed with water and then stoved at 130° C. for ½-hour to provide a coating of uniform 44 microns thickness.

EXAMPLE 16

This Example illustrates the use as surfactant of a poly(methylmethacrylate)/poly(ethylene glycol) graft copolymer.

A poly(methylmethacrylate)/poly(ethylene glycol) graft copolymer was prepared by copolymerising 30 parts methyl methacrylate and 70 parts methoxypoly(ethylene glycol)methacrylate at 30% solids content in a solvent using azodiisobutyronitrile as initiator.

An emulsion of 26% solids content was prepared from 105 parts of a tall oil fatty acid ester of "Epikote" 1004, 50 parts of a butylated melamine/formaldehyde resin, 3.5 parts of the graft copolymer and 237 parts of de-ionised water using an Ystral homogeniser. A phosphated steel panel was heated to 120° C. and immersed in the emulsion maintained at 25° C. The panel was allowed to cool in the emulsion, then removed, rinsed and stoved at 130° C. for ½-hour. A tough coating of uniform 10 microns thickness was produced.

When a similar panel was preheated to 160° C., the emulsion maintained at 35° C., and the above procedure repeated the ultimate stoved coating was of uniform 45 microns thickness.

EXAMPLE 17

This Example illustrates the effect of added electrolyte on the process of this invention.

An emulsion similar in composition to that described in Example 1(*b*) (but using 2-ethyl hexanol as the polyisocyanate blocking agent) and having a critical coalescence temperature of 66° C. was maintained at 25° C. A phosphated steel panel was heated to 180° C. and immersed in the emulsion. The panel was allowed to cool in the emulsion, removed and rinsed with water, air dried and then stoved at 180° C. for 30 minutes. The final coating was of uniform 70 microns thickness.

To another sample of the same emulsion was added 1% by weight of sodium chloride, the critical coalescence temperature being thus lowered to 62° C. A phosphated steel panel was heated to 180° C., immersed and allowed to cool in the emulsion maintained at 25° C. The final coating obtained by using a similar after-treatment was of uniform 100 microns thickness.

EXAMPLE 18

This Example illustrates the use of an alkyd resin containing poly(ethylene glycol) moieties as surfactant.

588 parts of the blend of butylated melamine/formaldehyde resin and alkyd resin used in Example 5 was mixed with 12.5 parts of an alkyd resin comprising moieties of a poly(ethylene glycol) and emulsified in 400 parts of de-ionised water to produce a stable emulsion of 40% solids content. The critical coalescence temperature of the emulsion was about 88° C. A phosphated steel panel was heated to 120° C. and immersed in the emulsion held at 25° C. The panel was removed, rinsed, air dried and stoved at 150° C. for ½-hour. The final coating was of uniform 12 microns thickness.

EXAMPLE 19

A non-ionic addition polymer latex of 40% solids content stabilised by poly(ethylene glycol) moieties present in the polymer was maintained at 25° C. It had a flocculation temperature of 92° C. A phosphated steel panel was heated to 120° C. and immersed in the latex. After cooling for 1 minute the panel was removed, rinsed, and stoved at 130° C. for ½-hour. The final coating was of uniform 12 microns thickness.

We claim:

1. A process of coating a surface of an article which is capable of being heated by contacting the heated surface of the article with a coating composition comprising an aqueous dispersion of an organic film-forming material which is sterically stabilised and which has a critical coalescence temperature which is lower than the temperature to which the surface of the article is heated so that the film-forming material is destabilised.

2. A process according to claim 1, wherein the organic film-forming material is sterically stabilised by non-ionic hydrophilic moieties which are derived from poly(ethylene glycol), poly(vinylpyrollidone), or from poly(vinyl alcohol) obtained by the hydrolysis of poly(-vinyl acetate).

3. A process according to claim 2, wherein the moieties are contained in the structure of the film-forming material.

4. A process according to claim 2, wherein the moieties are contained in a distinct surface active component of the aqueous dispersion which is associated with the film-forming material.

5. A process according to claim 3, wherein the film-forming material contains at least 1% by weight of the non-ionic hydrophilic moiety.

6. A process according to claim 4, wherein there is present at least 0.1% of the distinct surface active component by weight based on the weight of film-forming material.

7. A process according to claim 1, wherein the critical coalescence temperature of the coating composition is in the range 25°–99° C.

8. A process according to claim 1, wherein the surface to be coated is heated to a temperature at least 5° C. above the critical coalescence temperature of the coating composition.

9. A process according to claim 1, wherein the surface to be coated is a metal or a plastics material.

* * * * *